US012811131B2

(12) United States Patent
Lee et al.

(10) Patent No.: US 12,811,131 B2
(45) Date of Patent: Nov. 24, 2026

(54) INTERMIXING PRE-SINTERED PRECURSORS

(71) Applicant: FORD GLOBAL TECHNOLOGIES, LLC, Dearborn, MI (US)

(72) Inventors: Eunsung Lee, Novi, MI (US); Robert J. Kudla, Canton, MI (US); Chi Paik, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1096 days.

(21) Appl. No.: 17/865,560

(22) Filed: Jul. 15, 2022

(65) Prior Publication Data

US 2024/0021781 A1 Jan. 18, 2024

(51) Int. Cl.

| | |
|---|---|
| ***H01M 10/0525*** | (2010.01) |
| ***H01M 4/04*** | (2006.01) |
| ***H01M 4/485*** | (2010.01) |
| ***H01M 4/505*** | (2010.01) |
| ***H01M 4/525*** | (2010.01) |
| *H01M 4/02* | (2006.01) |

(52) U.S. Cl.

CPC ......... *H01M 4/0471* (2013.01); *H01M 4/485* (2013.01); *H01M 4/505* (2013.01); *H01M 4/525* (2013.01); *H01M 10/0525* (2013.01); *H01M 2004/028* (2013.01)

(58) Field of Classification Search

CPC ............... H01M 4/0471; H01M 4/525; H01M 2004/028

See application file for complete search history.

(56) References Cited

U.S. PATENT DOCUMENTS

| | | | | |
|---|---|---|---|---|
| 10,476,100 | B2 | 11/2019 | Paik et al. | |
| 2016/0329594 | A1 | 11/2016 | Drews et al. | |
| 2021/0066746 | A1 | 3/2021 | Hou et al. | |
| 2021/0135187 | A1* | 5/2021 | Park .................. | H01M 10/0525 |

FOREIGN PATENT DOCUMENTS

| | | | |
|---|---|---|---|
| CN | 109309229 | A * | 2/2019 |
| CN | 112794371 | A | 5/2021 |

OTHER PUBLICATIONS

Chen, Anqi, et al. "The formation, detriment and solution of residual lithium compounds on NI-rich layered oxides in lithium-ion batteries." Frontiers in Energy Research, vol. 8, Dec. 10, 2020. (Year: 2020).*

* cited by examiner

*Primary Examiner* — Allison Bourke
*Assistant Examiner* — Verita E Grannum
(74) *Attorney, Agent, or Firm* — David B. Kelley; Brooks Kushman P.C.

(57) ABSTRACT

A method for preparing materials for a positive electrode in a lithium-ion battery includes a step of preparing a fresh sintering precursor that includes a mixture of metal hydroxides or metal carbonates. The fresh sintering precursor is sintered in a first oxygen-containing gaseous environment at a first temperature to form a first sintered product. The first sintered product is intermixed with fresh sintering precursor to form a first intermixed sintering precursor. The first intermixed sintering precursor is sintered in a second oxygen-containing gaseous environment at a second temperature to form a second sintered product.

20 Claims, 3 Drawing Sheets

INTERMIXING PRE-SINTERED PRECURSORS

TECHNICAL FIELD

In at least one aspect, a method for making material for the positive electrode is a lithium-ion battery is provided.

BACKGROUND

In lithium-ion batteries, cathode energy density has been targeted to increase to offer higher vehicle range and performance. Cathode processing involves multiple sintering/calcination processes to ensure optimum performance in cathode properties (in composition, structure, morphology, particle size distribution, and surface textures). Furthermore, cathodes with nickel content higher than 60% require pure oxygen for the precursor to properly convert to lithiated transition metal oxide. In a nickel cobalt manganese (NCM), nickel cobalt aluminum (NCA), and nickel cobalt manganese aluminum (NCMA), the precursors sintering/calcination can take at least three steps Accordingly, there is a need to increase the thermal stability of battery cathodes for enabling successful battery electric vehicle technology and market.

SUMMARY

In at least one aspect, a method for preparing materials for a positive electrode in a lithium-ion battery is provided. The method includes a step of preparing or obtaining a fresh sintering precursor that includes a mixture of metal hydroxides or metal carbonates. The fresh sintering precursor is sintered in a first oxygen-containing gaseous environment at a first temperature to form a first sintered product. The first sintered product is intermixed with fresh sintering precursor to form a first intermixed sintering precursor. The first intermixed sintering precursor is sintered in a second oxygen-containing gaseous environment at a second temperature to form a second sintered product.

In another aspect, a method for preparing materials for a positive electrode in a lithium-ion battery is provided. The method includes a step of preparing or obtaining a fresh sintering precursor that includes a mixture of metal hydroxides and/or metal carbonates. The fresh sintering precursor is provided to a first sintering stage of a plurality of sintering stages in which each sintering stage receives a input the output from an immediate preceding sintering stage wherein sintering occurs at each sintering stage. Output from at least sintering stage is intermized with the input of a prior sintering stage.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
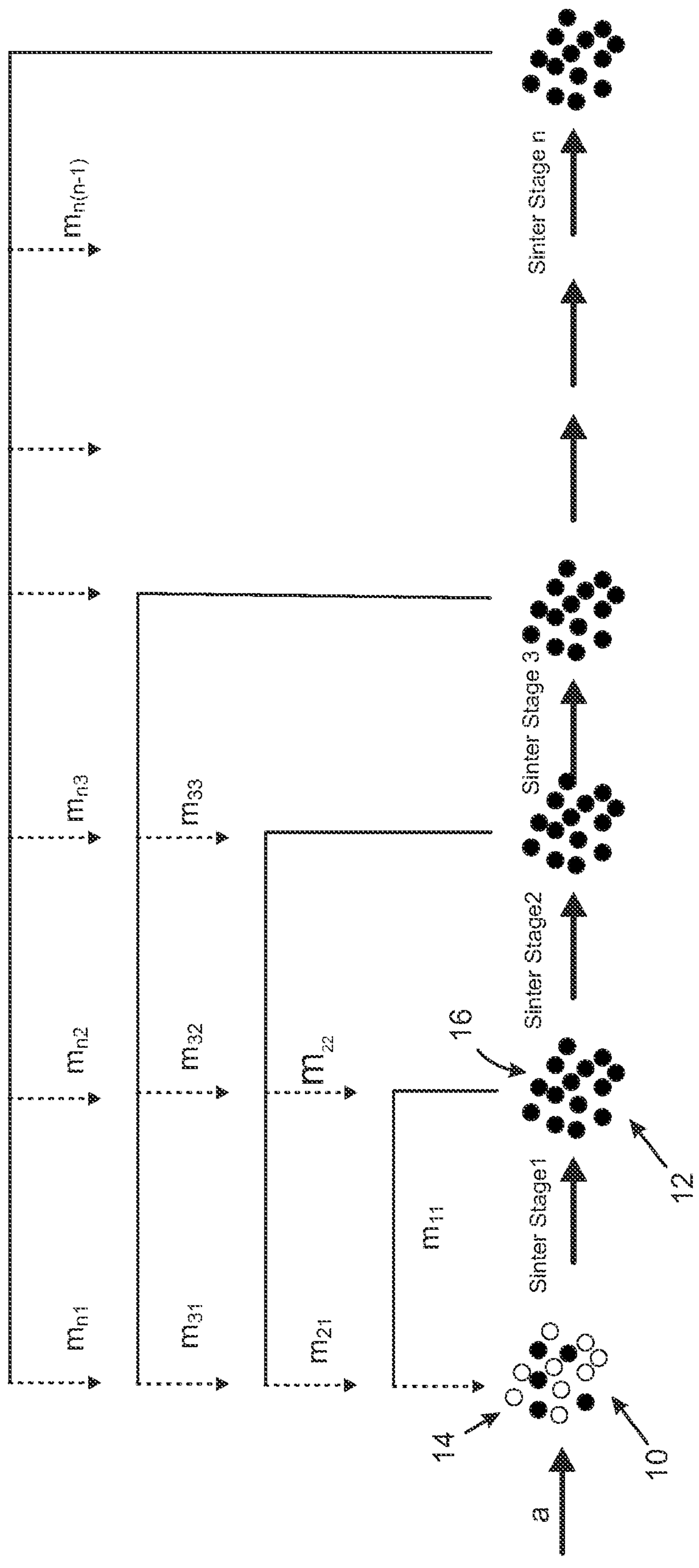
FIG. 1. Flowchart of a method for making sintered materials for the positive electrode in a lithium-ion battery.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

The term "positive electrode" means a battery cell electrode from which current flows out when the lithium-ion battery cell or battery is discharged. Sometimes a "positive electrode" is referred to as a "cathode."

The term "negative electrode" means a battery cell electrode to which current flows in when the lithium-ion battery cell is discharged. Sometimes a "negative electrode" is referred to as an "anode."

The term "cell" or "battery cell" means an electrochemical cell made of at least one positive electrode, at least one negative electrode, an electrolyte, and a separator membrane.

The term "battery" or "battery pack" means an electric storage device made of at least one battery cell. In a refinement, "battery" or "battery pack" is an electric storage device made of a plurality of battery cells.

The term "specific capacity" means the capacity per unit mass of the anode active. Specific capacity has units of milliamp hours/gram (mAh/g).

Abbreviations

"BEV" means battery electric vehicle.

FIG. 1 provides a flow chart of a method for preparing materials for a positive electrode for a lithium-ion battery. In step a), fresh sintering precursor 10 is prepared by methods known in the art for preparing metal hydroxides and carbonates that are used for lithium-ion battery positive electrodes. Therefore, these fresh sintering precursors include a mixture of metal hydroxides or metal carbonates. Examples of metal hydroxides include lithium hydroxide, cobalt hydroxide, nickel hydroxide, manganese hydroxide, and combinations thereof. Examples of metal carbonates include lithium carbonate, cobalt carbonate, nickel carbonate, manganese carbonate, and combinations thereof. Metal hydroxides are typically prepared from metal salts such as cobalt salts, manganese salts, nickel salts, and lithium salts. Specific examples of metal salts are lithium nitrate, cobalt nitrate, nickel nitrate, manganese nitrate, lithium sulfate, cobalt sulfate, nickel sulfate, manganese sulfate, lithium halide, cobalt halide, nickel halide, manganese halide, lithium acetate, cobalt acetate, nickel acetate, and manganese acetate. Typically, these salts are converted to metal hydroxides by a base such as sodium hydroxide and an optional complexing agent such as ammonium hydroxide. In a refinement, the fresh sintering precursor includes a lithium-containing material such as lithium hydroxide and/or lithium carbonate. In sintering stage 1), the fresh sintering precursor 10 is sintered in a first oxygen-containing gaseous environment at a first temperature to form a first sintered product 12. The sintering stage number is an integer n equal to the minimum number of sintering steps that a fresh sintering precursor has passed through. In step mu), the first sintered product 12 is intermixed with fresh sintering precursor to form a first intermixed sintering precursor 14. Each intermixing step is designated as mi where i is the stage from which a sintered product is mixed with the input precursor of an earlier sintering stage j. In another pass through sintering stage 1, the first intermixed sintering precursor is sintered in a second oxygen-containing gaseous environment at a second temperature to form a second sintered product 16.

Still referring to FIG. 1, one or more additional sintering stages are implemented. These additional sintering stages are designated as sintering stage 2, sintering stage 3, . . . , sintering stage nmax wherein nmax is the maximum number of sintering stages used. The one or more additional sintering stages receive as starting material sintering products of a previous sintering stage. In some refinements, the output of the one or more additional sintering stages is intermixed in step mij with an input to a previous sintering stage. As set forth above, each intermixing step is designated as mi where i is the stage from which a sintered product is mixed with the input precursor of an earlier sintering stage j. For example, mixtures of precursors sintered twice are intermixed with fresh pre-sintered precursors and/or precursors that have been sintered once. In another example, mixtures of precursors sintered three times are intermixed with fresh pre-sintered precursors and/or precursors that have been sintered once and/or precursors that have been sintered twice. In another example, a combination of precursors that are one, two, and/or three sintering stages behind can be intermixed and sintered together.

Sintering during each stage is performed in an oxygen-containing gas that includes oxygen in an amount greater than or equal to 20 percent. In some refinements, the oxygen-containing gas is at least in increasing order of preference 20 weight percent, 30 weight percent, 40 weight percent, 50 weight percent, or 60 weight percent of the total weight of the oxygen-containing gas. In further refinements, the oxygen-containing gas is at most in increasing order of preference 100 weight percent, 90 weight percent, 80 weight percent, 70 weight percent, or 65 weight percent of the total weight of the oxygen-containing gas. Each sintering stage is also characterized by the temperature at which the sintering occurs. Typically, the sintering in each stage occurs at a temperature from about 800 to 11° C.

In another variation, post-sintered metal oxides can to intermixed with sintering precursors that are one, two, and three process steps behind a final sintered product for final ripening and efficient calcination thereby allowing shorter calcination time and lower calcination temperature thereby not requiring pure oxygen for sintering and allowing lithium carbonate to be used as a lithium source.

Figure 2A:
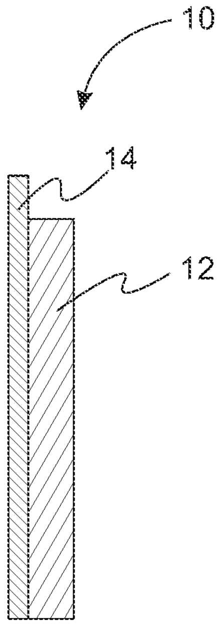
FIG. 2A. Schematic cross-section of a positive electrode having a positive electrode active material including the sintered material formed by the method of FIG. 1 and coated on one side of a current collector.
Figure 2B:
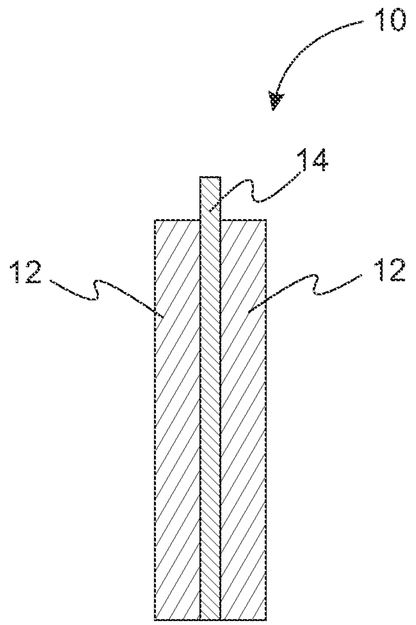
FIG. 2B. Schematic cross-section of a positive electrode having a positive electrode active material including the sintered material formed by the method of FIG. 1 and coated on both sides of a current collector.

Referring to FIGS. 2A and 2B, schematics of a positive electrode that includes the sintered material formed above are provided. Positive electrode 10 includes positive electrode active material layer 12 of positive electrode active material disposed over and typically contacting positive electrode current collector 14. Typically, positive electrode current collector 14 is a metal plate or metal foil composed of a metal such as aluminum, copper, platinum, zinc, titanium, and the like. Currently, copper is most commonly used for the positive electrode current collector. The positive electrode active material includes the sintered precursors and/or products described above.

Figure 3:
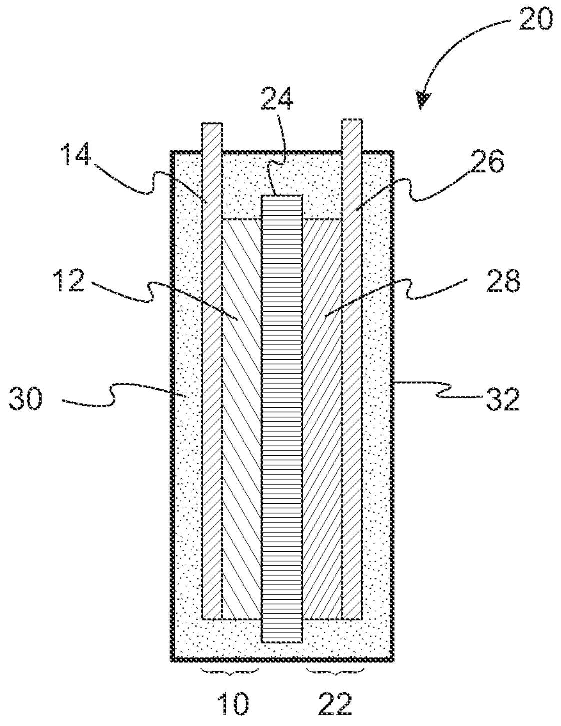
FIG. 3. Schematic cross-section of a battery cell incorporating the electrode of FIG. 2A.

With reference to FIG. 3, a schematic of a rechargeable lithium-ion battery cell incorporating the positive electrode of FIGS. 2A and 2B is provided. Battery cell 20 includes positive electrode 10 as described above, negative electrode 22, and separator 24 interposed between the positive electrode and the negative electrode. Negative electrode 22 includes an negative electrode current collector 26 and a negative active material layer 28 disposed over and typically contacting the negative current collector. Typically, negative electrode current collector 26 is a metal plate or metal foil composed of a metal such as aluminum, copper, platinum, zinc, titanium, and the like. Currently, copper is most commonly used for the negative electrode current collector. The battery cell is immersed in electrolyte 30 which is enclosed by battery cell case 32. Electrolyte 30 imbibes into separator 24. In other words, the separator 24 includes the electrolyte thereby allowing lithium ions to move between the negative and positive electrodes. The electrolyte includes a non-aqueous organic solvent and a lithium salt. The non-aqueous organic solvent serves as a medium for transmitting ions taking part in the electrochemical reaction of a battery.

Figure 4:
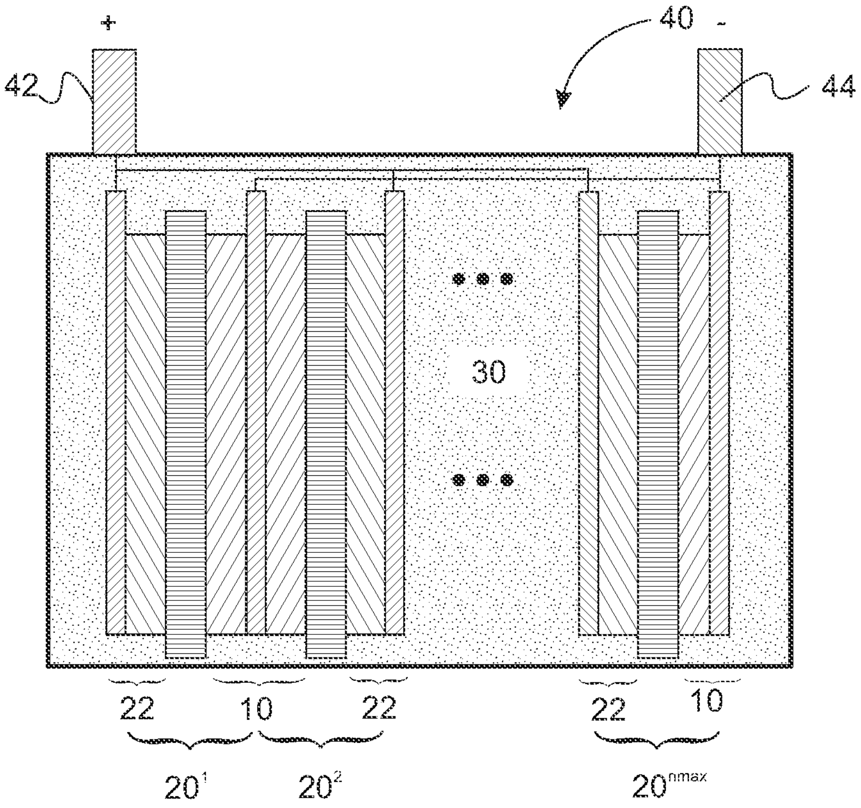
FIG. 4. Schematic cross-section of a battery incorporating the battery cell of FIG. 3.

With reference to FIG. 4, a schematic of a rechargeable lithium-ion battery incorporating the positive electrode of FIG. 1 and the battery cells of FIG. 2 is provided. Rechargeable lithium-ion battery 40 includes at least one battery cell of the design in FIG. 2. Typically, comprising rechargeable lithium-ion battery 40 includes at least one battery cell 20 of the design of FIG. 2. Each lithium-ion battery cell 20 includes a positive electrode 10 which includes one or more of the sintered materials set forth above, a negative electrode 22 which includes a negative active material, and an electrolyte 30, where i is an integer label for each battery cell. The label i runs from 1 to nmax, where nmax is the total number of battery cells in rechargeable lithium-ion battery 40. The electrolyte 30 includes a non-aqueous organic solvent and a lithium salt. The non-aqueous organic solvent serves as a medium for transmitting ions taking part in the electrochemical reaction of a battery. The plurality of battery cells can be wired in series, in parallel, or a combination thereof. The voltage output from battery 40 is provided across terminals 42 and 44. Advantageously, rechargeable lithium-ion battery 40 can have a specific capacity of greater than 150 mAh/g for each battery cell therein.

Referring to FIGS. 1, 2, 3, and 4, in a lithium-ion battery cell, some of the fresh sintering precursor or partially sintered metal oxides can be added into a cathode electrode coating process such that the fresh sintering precursor and/or the partially sintered metal oxides serve as an endothermic active materials continue sintering during a cell thermal runaway situation such that lower heat and temperature are released. In particular, a partially sintered cathode can be added to the positive electrode to scavenge heat and oxygen and lithium during a thermal runaway situation, thus offering additional protection to the cell.

Referring to FIGS. 3 and 4, separator 24 physically separates the negative electrode 22 from the positive electrode 10 thereby presenting shorting while allowing the transport of lithium ions for charging and discharging. Therefore, separator 24 can be composed of any material suitable for this purpose. Examples of suitable materials from which separator 24 can be composed include but are not limited to, polytetrafluoroethylene (e.g., TEFLON®), glass fiber, polyester, polyethylene, polypropylene, and combinations thereof. Separator 24 can be in the form of either a woven or non-woven fabric. Separator 24 can be in the form of a non-woven fabric or a woven fabric. For example, a polyolefin-based polymer separator such as polyethylene and/or polypropylene is typically used for a lithium-ion battery. In order to ensure heat resistance or mechanical strength, a coated separator includes a coating of ceramic or a polymer material may be used.

Referring to FIGS. 3 and 4, electrolyte 30 includes a lithium salt dissolved in the non-aqueous organic solvent. Therefore, electrolyte 30 includes lithium ions that can intercalate into the positive electrode active material during charging and into the anode active material during discharging. Examples of lithium salts include but are not limited to $LiPF_6$, $LiBF_4$, $LiSbF_6$, $LiAsF_6$, $LiC_4F_9SO_3$, $LiClO_4$, $LiAlO_2$, $LiAlCl_4$, LiCl, LiI, $LiB(C_2O_4)_2$, and combinations thereof. In a refinement, the electrolyte includes the lithium salt in an amount from about 0.1 M to about 2.0 M.

Still referring to FIGS. 3 and 4, the electrolyte includes a non-aqueous organic solvent and a lithium salt. Advantageously, the non-aqueous organic solvent serves as a medium for transmitting ions, and in particular, lithium ions participate in the electrochemical reaction of a battery. Suitable non-aqueous organic solvents include carbonate-based solvents, ester-based solvents, ether-based solvents, ketone-based solvents, alcohol-based solvents, aprotic solvents, and combinations thereof. Examples of carbonate-based solvents include but are not limited to dimethyl carbonate, diethyl carbonate, dipropyl carbonate, methylpropyl carbonate, ethylpropyl carbonate, methylethyl carbonate, ethylene carbonate, propylene carbonate, butylene carbonate, and combinations thereof. Examples of ester-based solvents include but are not limited to methyl acetate, ethyl acetate, n-propyl acetate, methylpropionate, ethylpropionate, γ-butyrolactone, decanolide, valerolactone, mevalonolactone, caprolactone, and combinations thereof. Examples of ether-based solvents include but are not limited to dibutyl ether, tetraglyme, diglyme, dimethoxyethane, 2-methyltetrahydrofuran, tetrahydrofuran, and the like, and the ketone-based solvent may include cyclohexanone, and the like. Examples of alcohol-based solvent include but are not limited to methanol, ethyl alcohol, n-propyl alcohol, isopropyl alcohol, and the like. Examples of the aprotic solvent include but are not limited to nitriles such as R—CN (where R is a $C_{2-20}$ linear, branched, or cyclic hydrocarbon that may include a double bond, an aromatic ring, or an ether bond), amides such as dimethylformamide, dioxolanes such as 1,3-dioxolane, sulfolanes, and the like. Advantageously, the non-aqueous organic solvent can be used singularly. In other variations, mixtures of the non-aqueous organic solvent can be used. Such mixtures are typically formulated to optimize battery performance. In a refinement, a carbonate-based solvent is prepared by mixing a cyclic carbonate and a linear carbonate. In a variation, electrolyte 30 can further include vinylene carbonate or an ethylene carbonate-based compound to increase battery cycle life.

Referring to FIGS. 2, 3, and 4, the negative electrode and the positive electrode can be fabricated by methods known to those skilled in the art of lithium-ion batteries. Typically, an active material (e.g., the positive or negative active material) is mixed with a conductive material, and a binder in a solvent (e.g., N-methylpyrrolidone) into an active material composition and coating the composition on a current collector. The electrode manufacturing method is well known and thus is not described in detail in the present specification. The solvent includes N-methylpyrrolidone and the like but is not limited thereto.

Referring to FIGS. 1, 2, 3, and 4, the positive electrode active material layer 12 includes one or more of the sintered materials set forth above, a binder, and a conductive material. The binder can increase the binding properties of positive electrode active material particles with one another and with the positive electrode current collector 14. Examples of suitable binders include but are not limited to polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylate styrene-butadiene rubber, an epoxy resin, nylon, and the like, and combinations thereof. The conductive material provides positive electrode 10 with electrical conductivity. Examples of suitable electrically conductive materials include but are not limited to natural graphite, artificial graphite, carbon black, acetylene black, ketjen black, carbon fibers, copper, metal powders, metal fibers, and combinations thereof. Examples of metal powders and metal fibers are composed of including nickel, aluminum, silver, and the like.

Referring to FIGS. 1, 2, 3, and 4, the negative active material layer 26 includes a negative active material, includes a binder, and optionally a conductive material. The negative active materials used herein can be those negative materials known to one skilled in the art of lithium-ion batteries. Negative active materials include but are not limited to, carbon-based negative active materials, silicon-based negative active materials, and combinations thereof. A suitable carbon-based negative active material may include graphite and graphene. A suitable silicon-based negative active material may include at least one selected from silicon, silicon oxide, silicon oxide coated with conductive carbon on the surface, and silicon (Si) coated with conductive carbon on the surface. For example, silicon oxide can be described by the formula $SiO_z$ where z is from 0.09 to 1.1. Mixtures of carbon-based negative active materials, silicon-based negative active materials can also be used for the negative active material.

The negative electrode binder increases the binding properties of negative active material particles with one another and with a current collector. The binder can be a non-aqueous binder, an aqueous binder, or a combination thereof. Examples of non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. Aqueous binders can be rubber-based binders or polymer resin binders. Examples of rubber-based binders include but are not limited to styrene-butadiene rubbers, acrylated styrene-butadiene rubbers, acrylonitrile-butadiene rubbers, acrylic rubbers, butyl rubbers, fluorine rubbers, and combinations thereof. Examples of polymer resin binders include but are not limited to polyethylene, polypropylene, ethylenepropylene copolymer, polyethyleneoxide, polyvinylpyrrolidone, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for preparing materials for a positive electrode in a lithium-ion battery, the method comprising: preparing or obtaining a fresh sintering precursor that includes a mixture of metal hydroxides or metal carbonates; sintering the fresh sintering precursor in a first oxygen-containing gaseous environment at a first temperature to form a first sintered product; intermixing the first sintered product with the fresh sintering precursor to form a first intermixed sintering precursor, wherein the first sintered product comprises at least one partially sintered or structurally distinct material formed under controlled sintering conditions, and wherein the intermixing occurs prior to any electrode layer formation; and sintering the first intermixed sintering precursor in a second oxygen-containing gaseous environment at a second temperature to form a second sintered product.

2. The method of claim 1 further comprising one or more additional sintering stages that receive as starting material sintering products of a previous sintering stage.

3. The method of claim 2, wherein an output of the one or more additional sintering stages is intermixed with an input to a previous sintering stage.

4. The method of claim 3 wherein mixtures of precursors sintered twice are intermixed with fresh pre-sintered precursors and/or precursors that have been sintered once.

5. The method of claim 3 wherein mixtures of precursors sintered three times are intermixed with fresh pre-sintered precursors and/or precursors that have been sintered once and/or precursors that have been sintered twice.

6. The method of claim 2 wherein a combination of precursors that are one, two, and/or three sintering stages behind can be intermixed and sintered together.

7. The method of claim 2 wherein post-sintered metal oxides can to intermixed with sintering precursors that are one, two, and three process steps behind a final sintered product for final ripening and efficient calcination thereby allowing shorter calcination time and lower calcination temperature thereby not requiring pure oxygen for sintering and allowing lithium carbonate to be used as a lithium source.

8. The method of claim 2, wherein fresh sintering precursor or partially sintered metal oxides are added into a cathode electrode coating process such that the fresh sintering precursor and/or the partially sintered metal oxides serve as an endothermic active material that continues sintering during a cell thermal runaway situation such that lower heat and temperature are released.

9. The method of claim 1, wherein the fresh sintering precursor is a precursor for forming cobalt manganese (NCM), nickel cobalt aluminum (NCA), or nickel cobalt manganese aluminum (NCMA).

10. The method of claim 1, wherein the fresh sintering precursor includes a component selected from the group consisting of lithium hydroxide, cobalt hydroxide, nickel hydroxide, manganese hydroxide, lithium carbonate, cobalt carbonate, nickel carbonate, manganese carbonate, and combinations thereof.

11. A positive electrode including a sintered material formed by the method of claim 1.

12. A method for preparing materials for a positive electrode in a lithium-ion battery, the method comprising: preparing or obtaining a fresh sintering precursor that includes a mixture of metal hydroxides and/or metal carbonates; providing the fresh sintering precursor to a first sintering stage of a plurality of sintering stages in which each sintering stage receives as input, output from an immediately preceding sintering stage wherein sintering occurs at each sintering stage; and intermixing output from at least one of each sintering stage with the input of one of the preceding sintering stages to form a first intermixed sintering precursor, wherein a first sintered product comprises at least one partially sintered or structurally distinct material formed under controlled sintering conditions, and wherein the intermixing occurs prior to any electrode layer formation.

13. The method of claim 12 wherein mixtures of precursors sintered twice are intermixed with fresh pre-sintered precursors and/or precursors that have been sintered once.

14. The method of claim 12, wherein mixtures of precursors sintered three times are intermixed with fresh pre-sintered precursors and/or precursors that have been sintered once and/or precursors that have been sintered twice.

15. The method of claim 12, wherein a combination of precursors that are one, two, and/or three sintering stages behind can be intermixed and sintered together.

16. The method of claim 12, wherein post-sintered metal oxides can to intermixed with sintering precursors that are one, two, and three process steps behind a final sintered product for final ripening and efficient calcination thereby allowing shorter calcination time and lower calcination temperature and not requiring using pure oxygen for sintering and allow lithium carbonate to be used as a lithium source.

17. The method of claim 12, wherein post in a lithium-ion battery cell, some of the fresh sintering precursor or partially sintered metal oxides can be added into a cathode electrode coating process such that the fresh sintering precursor and/or the partially sintered metal oxides serve as an endothermic active materials continue sintering during a cell thermal runaway situation such that lower heat and temperature are released.

18. The method of claim 12, wherein the fresh sintering precursor is a precursor for forming cobalt manganese (NCM), nickel cobalt aluminum (NCA), or nickel cobalt manganese aluminum (NCMA).

19. The method of claim 12, wherein the fresh sintering precursor includes a component selected from the group consisting of lithium hydroxide, cobalt hydroxide, nickel hydroxide, manganese hydroxide, lithium carbonate, cobalt carbonate, nickel carbonate, manganese carbonate, and combinations thereof.

20. A positive electrode including a sintered material formed by the method of claim 12.

* * * * *